US012482158B2

United States Patent
Lee (10) Patent No.: US 12,482,158 B2
(45) Date of Patent: Nov. 25, 2025

(54) USER TERMINAL, SERVER AND METHOD OF OPERATION FOR IMAGE EDITING

(71) Applicant: Sang Ho Lee, Seoul (KR)

(72) Inventor: Sang Ho Lee, Seoul (KR)

(73) Assignee: Sang Ho Lee, Seoul (KR)

( * ) Notice: Subject to any disclaimer, the term of this patent is extended or adjusted under 35 U.S.C. 154(b) by 282 days.

(21) Appl. No.: 18/369,216

(22) Filed: Sep. 18, 2023

(65) Prior Publication Data

US 2025/0086859 A1   Mar. 13, 2025

(30) Foreign Application Priority Data

Sep. 11, 2023   (KR) ................... 10-2023-0120201

(51) Int. Cl.
*G06T 11/60* (2006.01)
*G06V 10/774* (2022.01)
*G06V 10/82* (2022.01)
*G06V 40/10* (2022.01)

(52) U.S. Cl.
CPC ............ *G06T 11/60* (2013.01); *G06V 10/774* (2022.01); *G06V 10/82* (2022.01); *G06V 40/10* (2022.01)

(58) Field of Classification Search
CPC ........... G06T 11/60; G06T 2207/20084; G06T 2207/20081; G06V 10/774; G06V 40/10; G06V 10/82; G06V 30/10; G06N 3/045; G06N 3/0464
See application file for complete search history.

(56) References Cited

U.S. PATENT DOCUMENTS

| | | | |
|---|---|---|---|
| 2024/0135611 A1* | 4/2024 | Costin | G06T 11/60 |
| 2024/0161462 A1* | 5/2024 | Gandelsman | G06T 5/60 |
| 2025/0061650 A1* | 2/2025 | Gadelha | G06T 7/50 |
| 2025/0078349 A1* | 3/2025 | Cho | G06T 11/60 |
| 2025/0078361 A1* | 3/2025 | Narayana | G06T 11/60 |

FOREIGN PATENT DOCUMENTS

| | | |
|---|---|---|
| KR | 10-2287407 B1 | 8/2021 |
| KR | 10-2022-0147545 A | 11/2022 |
| KR | 10-2023-0017298 A | 2/2023 |

OTHER PUBLICATIONS

Sudipta, et al., 'Identity-Preserving Aging of Face Images via Latent Diffusion Models', IJCB 2023, arXiv:2307.08585v1 [cs.CV], Jul. 17, 2023.

* cited by examiner

*Primary Examiner* — Xilin Guo
(74) *Attorney, Agent, or Firm* — Nicholas Park (57) ABSTRACT

Disclosed are a user terminal, a server, and a method of operation capable of preserving and editing identity of an original image by performing user-customized learning on a pre-trained artificial neural network. The user terminal according to an embodiment includes an interface unit, a communication unit, and a control unit, in which the control unit may receive an original input image to be edited from a user and a text prompt including information about the editing, and transmit the received original input image to a server including a first artificial neural network trained to edit the input image according to the input text prompt, and receive, from the server, an output image for the original input image edited according to the text prompt by the first artificial neural network subjected to user-customized learning based on the original input image, and output the received output image through the interface unit.

1 Claim, 11 Drawing Sheets

USER TERMINAL, SERVER AND METHOD OF OPERATION FOR IMAGE EDITING

CROSS-REFERENCE TO RELATED APPLICATION

This application claims priority from and the benefit of Korean Patent Application No. 10-2023-0120201 filed on Sep. 11, 2023, which is hereby incorporated by reference in its entirety.

BACKGROUND

Field of the Invention

The present invention relates to a technology for image editing, and more particularly, to a user terminal, a server, and a method of operation capable of preserving and editing identity of an original image by performing user-customized learning on a pre-trained artificial neural network.

Discussion of Related Art

Recently, various image editing technologies using artificial intelligence have been researched. Among them, there is a diffusion model that is pre-trained through prompts. The diffusion model is a generative model that generates data and performs a forward process or diffusion process of adding noise to data little by little and turning the data into complete noise, and in contrast, performs a reverse process of generating data while restoring the data from noise little by little. However, the currently developed image generation and editing technology using generative artificial intelligence technology has the problem of not sufficiently preserving original identity when editing the original image.

Korean Patent Laid-Open Publication No. 10-2023-0017298 provides Facial Expression Editing Method and Electronic Device.

SUMMARY OF THE INVENTION

The present invention provides a user terminal, a server, and a method of operation capable of preserving and editing identity of an original image by performing user-customized learning on a pre-trained artificial neural network.

According to an exemplary embodiment, a user terminal includes: an interface unit through which an image and text are input and output; a communication unit that performs communication with a server including one or more artificial neural networks; and a control unit that controls the interface unit and the communication unit, in which the control unit receives an original input image to be edited from a user and a text prompt including information about the editing, and transmits the received original input image to a server including a first artificial neural network trained to edit the input image according to the input text prompt, and receives, from the server, an output image for the original input image edited according to the text prompt by the first artificial neural network subjected to user-customized learning based on the original input image, and outputs the received output image through the interface unit.

The first artificial neural network may be pre-trained to receive text data and a synthesized image generated by synthesizing a photographic image including a person with noise and generate an output image corresponding to the photographic image, and perform primary user-customized learning using a synthesized image for each of the original input image and one or more related images for the original input image and text data for each of the original input image and the one or more related images.

The text data may include information about at least one of one or more elements from which the identity of a person included in the photographic image is confirmed.

The one or more related images may be at least one of an image received from the user through the interface unit and an image extracted from a database based on the original input image.

After the primary user-customized learning is completed, the first artificial neural network may perform secondary user-customized learning based on the synthesized image for the original input image and the text data for the original image.

The control unit may input the original input image and the text prompt from the server to a first artificial neural network for which the secondary user-customized learning is completed and receive an output image for the original input image edited according to the text prompt.

According to another exemplary embodiment, a server includes: a communication unit that performs communication with a user terminal; a first artificial neural network trained to receive text data and a synthesized image generated by synthesizing a photographic image including a person with noise and generate an output image corresponding to the photographic image; and a control unit that controls user-customized learning and operation of the communication unit and the first artificial neural network, in which the control unit receives a text prompt including an original input image to perform image editing and an image editing request from a user terminal, performs user-customized learning on the first artificial neural network based on the original input image, and transmits, to the user terminal, an edited output image from the original input image generated by inputting the original input image and the text prompt to the first artificial neural network subjected to the user-customized learning.

The control unit may generate one or more synthesized images by synthesizing the original input image and each of one or more related images for the original input image with noise, and input the one or more synthesized images and text data for each of the original input image and the one or more related images to the first artificial neural network to perform the primary user-customized learning on the first artificial neural network.

The control unit may input the synthesized image generated by synthesizing the noise with the original input image and the text data for the synthesized image to the first artificial neural network subjected to the primary user-customized learning, and perform secondary user-customized learning on the first artificial neural network.

The control unit may input the original input image and the text prompt to the first artificial neural network subjected to the secondary user-customized learning to generate an output image by editing the original input image according to the text prompt and transmits the generated output image to the user terminal.

DETAILED DESCRIPTION

Hereinafter, embodiments of the present invention will be described in detail with reference to the accompanying drawings. When it is determined that the detailed description of the known functions or configurations in describing the present disclosure may obscure the gist of the present invention, the detailed description thereof will be omitted. Further, the terminologies used below are defined in consideration of the functions in the present invention and may be construed in different ways according to the intentions of users and operators. Therefore, the definitions should be construed based on the content throughout the present specification.

Hereinafter, embodiments of a user terminal, a server, and a method of operation for image editing will be described in detail with reference to the accompanying drawings.

Figure 1:
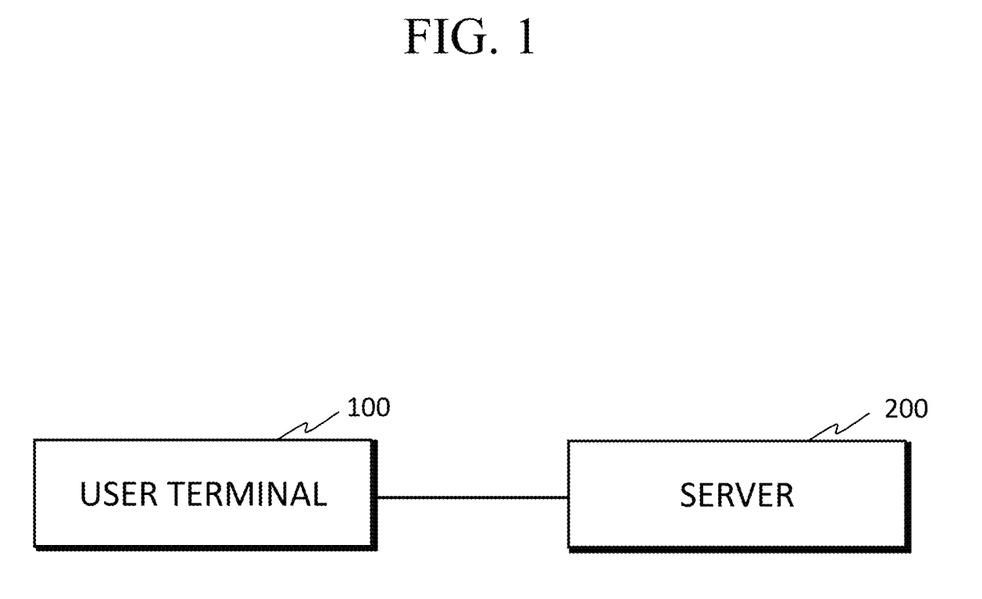
FIG. 1 is an exemplary diagram for describing an environment in which image editing is performed according to an embodiment.

FIG. 1 is an exemplary diagram for describing an environment in which image editing is performed according to an embodiment.

Referring to FIG. 1, a system for image editing may include a user terminal 100 and a server 200.

According to one example, the user terminal 100 may receive a request and data for image editing from a user through an interface and output an edited image. In addition, the user terminal 100 may communicate with the server and transmit images and text prompts received from the user to the server. The user terminal 100 may receive the edited image from the server and output the received image to a user through an interface.

According to one example, the server 200 may communicate with the user terminal 100 through a wired or wireless network. The server 200 includes one or more artificial neural networks and may include a control unit capable of learning and controlling the artificial neural networks. The server 200 may perform user-customized learning on the artificial neural network using the images and text prompts received from the user terminal 100, and may edit the images using the artificial neural network that has undergone the user-customized learning.

According to one example, functions provided for editing the images in the user terminal 100 and the server 200 may be divided as in the embodiments described below. However, the following embodiments do not limit devices on which the corresponding functions are performed, and each function may be performed in at least one of the user terminal 100 and the server 200 according to the implementation method. In other words, some or all of the functions performed in the user terminal 100 may be performed in the server 200, or some or all of the functions performed in the server 200 may be performed in the user terminal 100.

Figure 2:
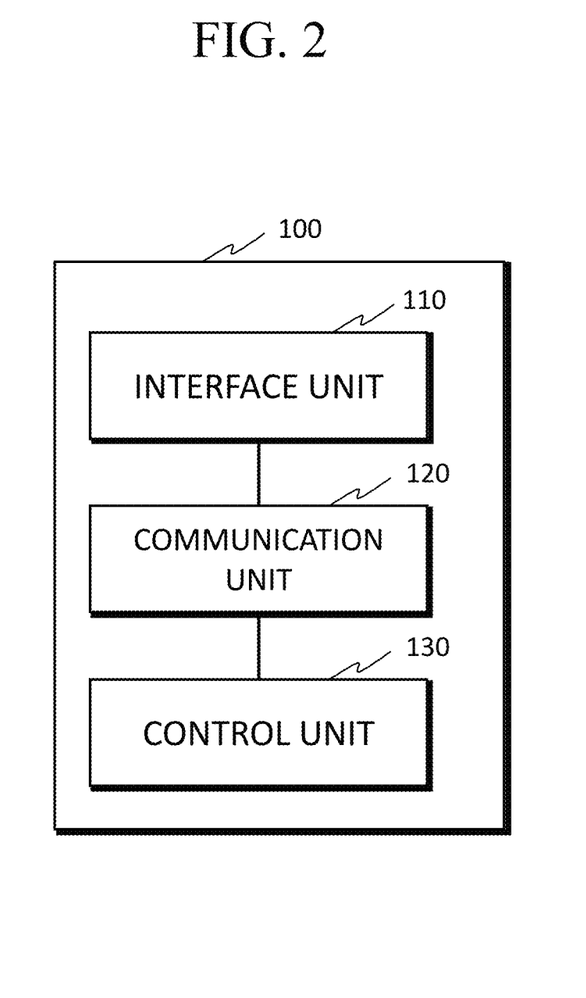
FIG. 2 is a configuration diagram of a user terminal according to an embodiment.

FIG. 2 is a configuration diagram of the user terminal according to the embodiment.

Referring to FIG. 2, the user terminal 100 may include an interface unit 110 for inputting and outputting an image and text, a communication unit 120 for communicating with a server including one or more artificial neural networks, and a control unit 130 for controlling the interface unit 110 and the communication unit 120.

According to one example, the interface unit 110 may be at least one of a keyboard, a mouse, a monitor, a touch screen, a microphone, and a camera for inputting and outputting data. As an example, a user may take a photo or select a photo stored in the user terminal 100 through the interface unit 110. In addition, a user may input text data or voice data for image editing into the interface unit 110.

Figure 3:
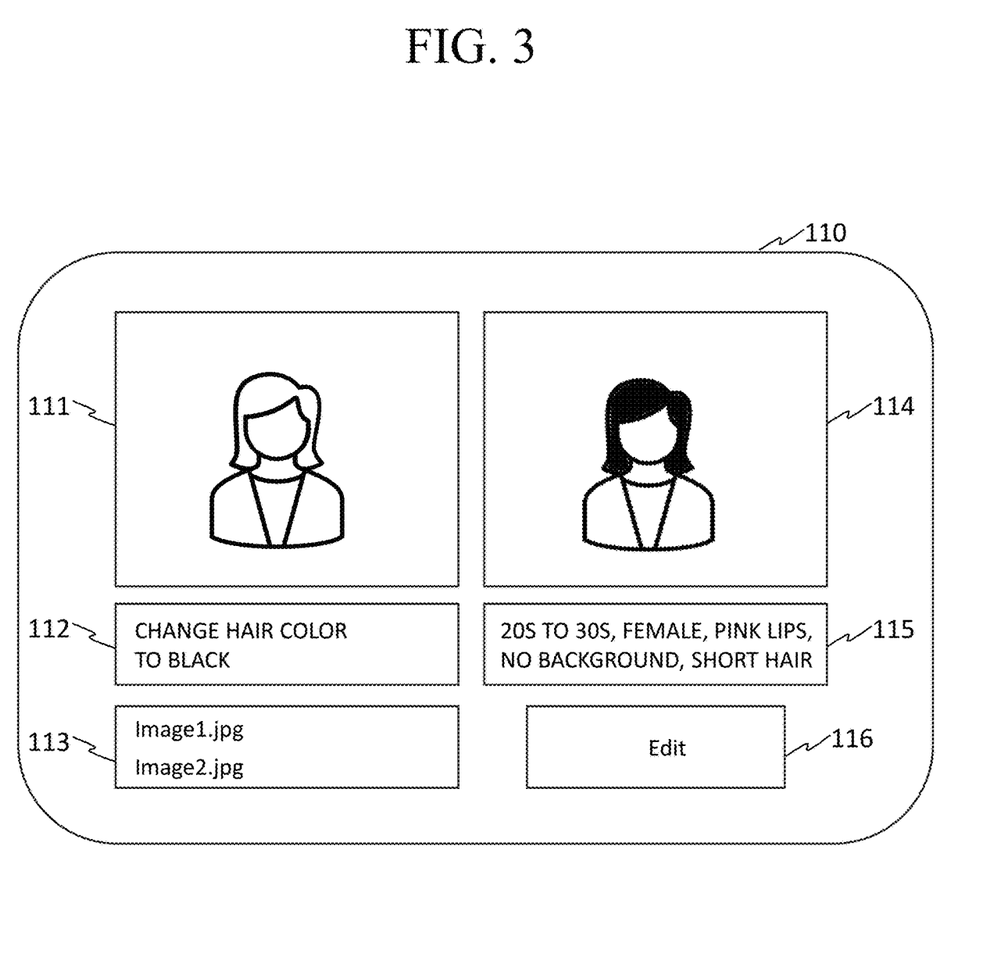
FIG. 3 is an exemplary diagram for describing an interface unit according to an embodiment.

Referring to FIG. 3, the interface unit 110 may receive an image to be edited from a user and output the input image 111. In addition, a user may input information about editing through the interface unit 110. For example, editing information such as "change hair color to black" may be input through text or voice. The interface unit 110 may output the input editing information as text prompt 112 and provide the text prompt 112 to the user.

As an example, a user may input an additional image 113 that may be used for editing through the interface unit 110. The user terminal 100 may transmit the additional image 113 received from the user to the server 200, and the server 200 may perform user-customized learning on the artificial neural network using the additional image input by the user.

According to one example, the user terminal 100 may receive the edited image from the server 200 and output the edited image 114 through the interface unit 110. In addition, the user terminal 100 may receive information 115 about at least one of the one or more elements from which the identity of a person included in an original image analyzed by the server 200 may be confirmed and output the received information 115 through the interface unit 110. For example, analysis results such as "20 s to 30 s, female, pink lips, no background, short hair" may be output as information about one or more elements from which the identity in the image 111 on which a user requests editing may be confirmed. For example, elements from which the person's identity may be confirmed may be at least one of gender, age, race, skin color, hair color, facial expression, and whether or not the person is wearing glasses.

According to one example, the image and text data displayed on the interface unit 110 of FIG. 3 are exemplary. Accordingly, only a portion of the displayed image and text data may be displayed, and the image or text data output through the interface unit 110 may vary according to the editing process. For example, in an initial stage of image editing, the original image 111 and the text prompt 112 may be output, and after the editing is completed, the edited image 114 may be output.

According to an embodiment, the control unit 130 may receive an original input image to be edited from a user and a text prompt including information about the editing, and transmit the received original input image to a server including a first artificial neural network trained to edit the input image according to the input text prompt. As an example, the original input image may be an image of at least one of a photo, a picture, or an illustration including a human face, and may be expressed in terms such as an image or a photographic image.

Referring to FIG. 3, the control unit 130 may receive the original input image 111 to be edited and the text prompt 112 including information about editing from a user through the interface unit 110. Thereafter, the control unit 130 may transmit the original input image 111 and the text prompt 112 received through the communication unit 120 to the server 200.

According to an embodiment, the control unit 130 receives, from the server 200, an output image for the original input image edited according to a text prompt by a first artificial neural network subjected to user-customized learning based on the original input image, and outputs the received output image to the interface unit 110.

As an example, the control unit 130 may receive the edited output image through the communication unit 120 and output the received edited image 114 through the interface unit 110.

According to an embodiment, the first artificial neural network performing the image editing may be pre-trained to receive text data and a synthesized image generated by synthesizing a photographic image including a person with noise and may generate an output image corresponding to the photographic image.

As an example, the first artificial neural network may be a diffusion model. For example, the diffusion model is a generative model that generates data and performs a forward process or diffusion process of adding noise to data little by little and turning the data into complete noise, and in contrast, performs a reverse process of generating data while restoring the data from noise little by little.

According to an embodiment, the first artificial neural network may perform primary user-customized learning using synthesized images for each of the original input image and one or more related images for the original input image and text data for each of the original input image and the one or more related images. As an example, the first artificial neural network may receive a synthesized image and text data for the synthesized image, and restore a photographic image based on the input synthesized image and text data. Thereafter, the control unit 230 may calculate a loss function based on a difference between the photographic image used in the input synthesized image and the output image, and repeatedly perform primary user-customized learning until the loss function value converges to a predetermined range.

According to an embodiment, the text data may include information about at least one of one or more elements from which the identity of a person included in the photographic image may be confirmed. For example, elements from which the person's identity may be confirmed may be at least one of gender, age, race, skin color, hair color, facial expression, and whether or not the person is wearing glasses. For example, when performing the user-customized learning using an original input image, the text data for the original input image is used rather than a text prompt. Accordingly, the text prompt and the text data may be different.

According to an embodiment, the one or more related images may be at least one of an image received from the user through the interface unit and an image extracted from a database based on the original input image. For example, as illustrated in FIG. 3, the control unit 130 may input a photo related to the original input image from the user. In this case, the input photo may be a photo of the same person as a person included in the original input image. For example, the related images may be images searched from a database based on the original input image from the server. For example, the server may extract keywords by analyzing the original input image, search for images using the extracted keywords, and then extract images having a certain reference of similarity to the original input image and use the extracted images as the related images.

For example, the database may be a storage device installed inside or outside the server. As another example, the database may be a storage device included in one or more user terminals connected to a server. In this case, the server may search for images that the user of the user terminal has agreed to use or images included in the storage device to which the user has agreed to access.

As an example, the server may use both the related images input by the user and the images searched from the database. For example, when the number of related images received by the server from the user terminal is less than or equal to a predetermined number, the server may search for the database and add the related images. As another example, the server may analyze the text prompt input by the user, and when there are no images related to the text prompt among the related images input by the user or the number of related images is less than or equal to a predetermined number, may search the database and add the related images. For example, when a user requests that the related images should be edited as "smiling appearance" but there is no image related to the smiling appearance in the related images input by the user, the server may search the database to search for the image related to the smiling appearance and generate the related images.

According to an embodiment, after the primary user-customized learning is completed, the first artificial neural network may perform secondary user-customized learning based on the synthesized image for the original input image and the text data for the original image. As an example, the first user-customized learning is learning the first artificial neural network using the original input image and the related images, while the second user-customized learning includes additionally performing the user-customized learning using only the original input image.

According to an embodiment, the control unit 130 may input the original input image and the text prompt from the server 200 to the first artificial neural network for which the secondary user-customized learning has been completed, and receive the output image for the original input image edited according to the text prompt. That is, the control unit 130 may receive the edited image through the first artificial neural network for which the user-customized learning has been completed in two steps, rather than the pre-trained first artificial neural network, and provide the edited image to the user.

The embodiments of FIGS. 2 and 3 are part of the operation of the user terminal 100, and specific operations related to the server 200 will be described through later embodiments. Accordingly, the embodiments of the server described below may be interpreted as content about the server operating with the user terminal. As an example, some of the functions of the server described below may be implemented through the user terminal.

Figure 4:
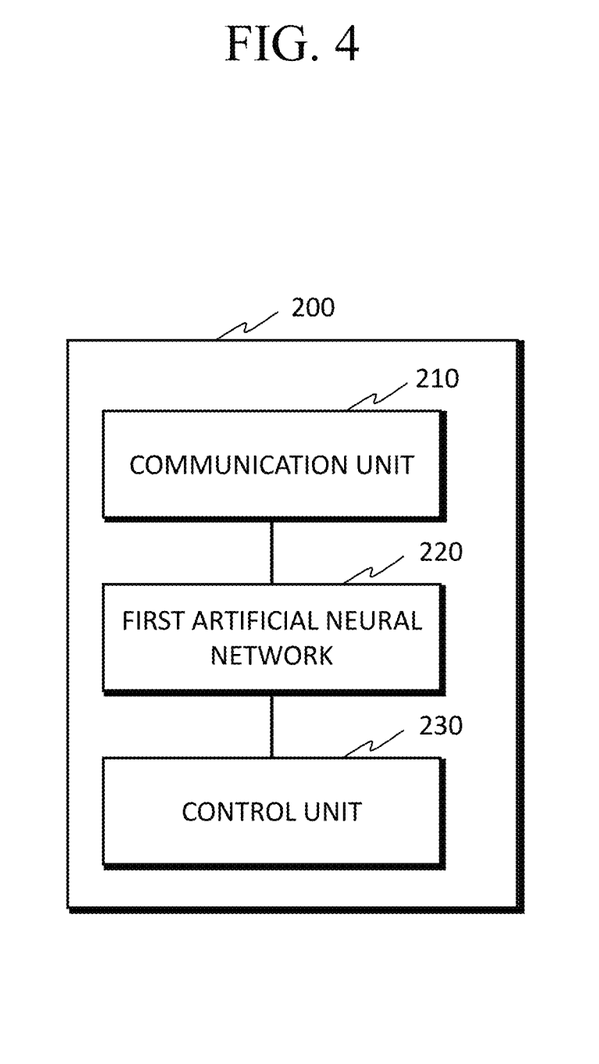
FIG. 4 is a configuration diagram of a server according to an embodiment.

FIG. 4 is a configuration diagram of the server according to an embodiment.

Referring to FIG. 4, the server may include a communication unit for communicating with a user terminal, a first artificial neural network 220 trained to receive text data and a synthesized image generated by synthesizing a photographic image including a person with noise and generate an output image corresponding to the photographic image, and a control unit 230 for controlling user-customized learning and operation of the communication unit 210 and the first artificial neural network 220. Among the following embodiments, overlapping content with the embodiment for the user terminal is omitted, but can be equally applied.

According to an embodiment, the control unit 230 may receive a text prompt including an original input image to perform image editing and image editing requirements from the user terminal. Thereafter, the control unit 230 may perform the user-customized learning on the first artificial neural network based on the original input image.

For example, the artificial neural network may be controlled by a processor, and each artificial neural network may be stored in a memory of a computing device in a software form or implemented in the form of a hardware circuit. In addition, the artificial neural network may be implemented as a combination of software and hardware.

According to an embodiment, the first artificial neural network 220 may be trained to receive text data and a synthesized image generated by synthesizing a photographic image including a person with noise and may generate an output image corresponding to the photographic image.

As an example, the first artificial neural network 220 may be a diffusion model. For example, the diffusion model is a generative model that generates data, and performs a forward process or diffusion process of adding noise to data little by little and turning the data into complete noise, and in contrast, performs a reverse process of generating data while restoring the data from noise little by little.

According to an embodiment, the control unit 230 may control the user-customized learning and operation of the first artificial neural network 220. For example, the control unit 230 may additionally perform the user-customized learning on the pre-trained first artificial neural network 220 according to the user's request.

According to an embodiment, the control unit 230 may receive the text prompt including the original input image to perform the image editing and image editing requirements from the user. The control unit 230 may perform the user-customized learning on the first artificial neural network based on the received original input image, and input the original input image and the text prompt to the first artificial neural network subjected to the user-customized learning to generate the output image by editing the original input image.

For example, the control unit 230 may receive a text prompt requesting editing of a photographic image such as "Change to a smiling face" as well as a photographic image including a human face from a user. In this case, the control unit 230 may perform the user-customized learning on the first artificial neural network based on the received photographic image, and use the first artificial neural network subjected the user-customized learning to generate the human face included in the photographic image according to the text prompt as the output image edited as the smiling face.

According to an embodiment, the control unit 230 may generate one or more synthesized images by synthesizing the original input image and each of one or more images related to the original input image with noise. As an example, the synthesized image may be an input of the diffusion model in an operation of the diffusion model to restore data from noise.

According to an embodiment, the control unit 230 may generate one or more synthesized images by synthesizing the original input image and each of one or more related images for the original input image with noise, and input the one or more synthesized images and text data for each of the original input image and the one or more related images to the first artificial neural network to perform the primary user-customized learning on the first artificial neural network.

Figure 5:
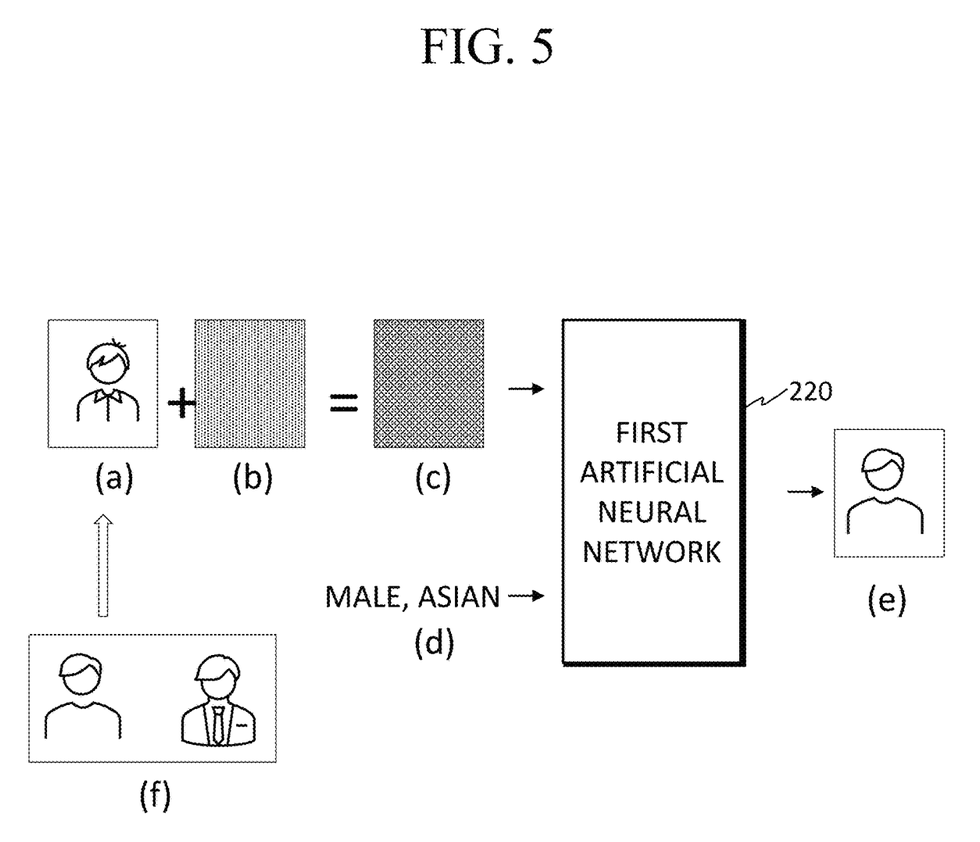
FIGS. 5 to 9 are exemplary diagrams for describing an operation of a server according to an example.
Figure 6:
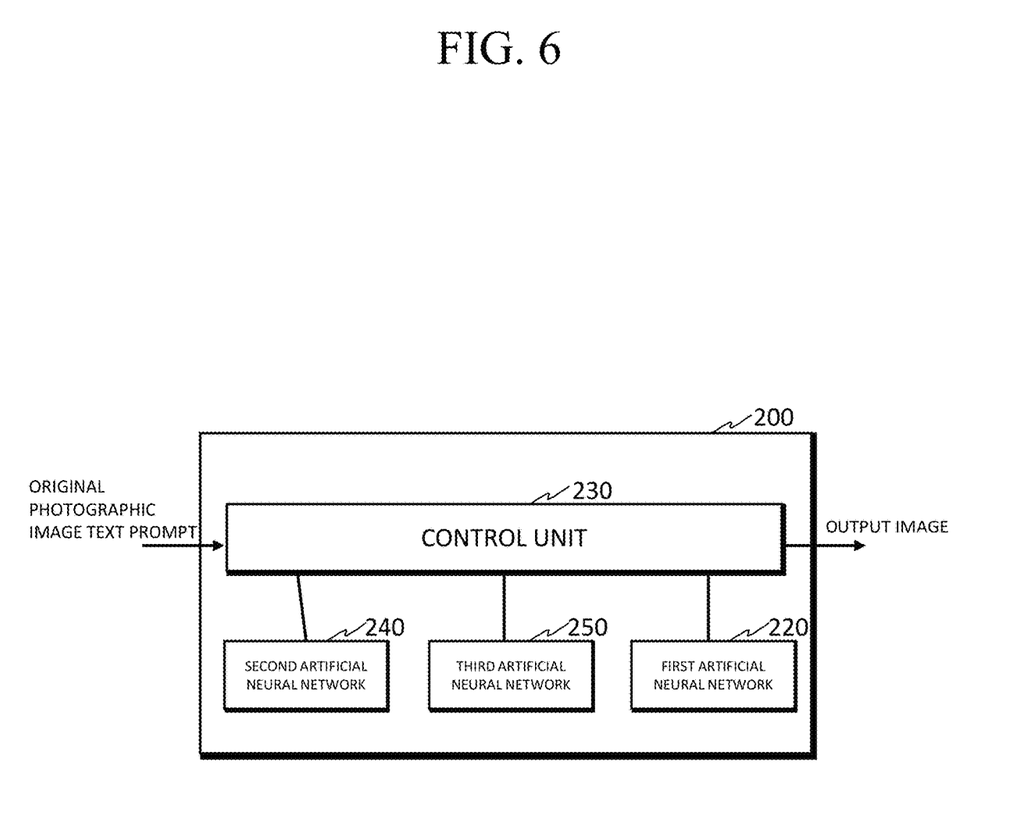

Referring to FIG. 5, the control unit 230 may generate one or more synthesized images (c) by synthesizing noise (b) with the original input image (a). In addition, the control unit 230 may generate one or more synthesized images by synthesizing each of one or more related images (f) for the original input image with noise. In this case, the noise synthesized with the original input image and one or more related images may be different noise.

As an example, the related image may be an image for the same person as the person included in the original input image. In this case, the related image may be a photo input by a user or a photo for which the control unit 230 searches the database. To this end, the control unit 230 may have identity information about the person included in the image.

As another example, the related image may be the image for which the control unit 230 searches the database based on the original input image. In this case, the control unit 230 may search the database in a predetermined manner, calculate a similarity between the image found through the search and the original input image, and select a photo with similarity greater than or equal to a predetermined similarity. Accordingly, the selected image may be selected regardless of the identity of the person included in the original input image. A specific method thereof will be described with reference to the drawings below.

According to an embodiment, the control unit 230 may input synthesized images for each of the original input image and one or more related images for the original input image to the first artificial neural network. In addition, the control unit 230 may input the text data for each of the original input image and one or more related images for the original input image to the first artificial neural network. In this way, the control unit 230 may perform the primary user-customized learning on the first artificial neural network 220.

As an example, the first artificial neural network 220 may receive a synthesized image (c) and text data (d) for the synthesized image, and restore a photographic image (e) based on the input synthesized image (c) and text data (d). Thereafter, the control unit 230 may calculate a loss function based on a difference between photographic images (a and f) used in the input synthesized image and the output image (e) for each of the photographic images (a and f), and repeatedly perform the primary user-customized learning until the loss function value converges to a predetermined range.

According to an embodiment, the text data may include information about at least one of one or more elements from which the identity of a person included in the photographic image may be confirmed. For example, elements from which the person's identity may be confirmed may be at least one of gender, age, race, skin color, hair color, facial expression, and whether or not the person is wearing glasses. For example, when performing the user-customized learning using the original input image, the text data for the original input image is used rather than the text prompt. Accordingly, the text prompt and the text data may be different.

According to an embodiment, the control unit 230 may input the synthesized image generated by synthesizing the noise with the original input image and the text data for the synthesized image to the first artificial neural network subjected to the primary user-customized learning, and perform the secondary user-customized learning on the first artificial neural network.

In other words, the control unit 230 may perform the primary user-customized learning using the original input image and one or more related images, and perform the secondary user-customized learning using only the original input image. Referring to FIG. 5, the control unit 230 may train the first artificial neural network using only the synthesized image and text data for the original input image (a).

In this case, the control unit 230 may calculate the loss function based on the difference between the photographic image (a) used in the input synthesized image and the output image (e), and repeatedly perform the secondary user-customized learning until the loss function value converges to the predetermined range.

According to an embodiment, the control unit 230 may input the original input image and the text prompt to the first artificial neural network subjected to the secondary user-customized learning to generate the output image by editing the original input image according to the text prompt. For example, the control unit 230 may receive a text prompt requesting editing of a photographic image such as "Change to a smiling face" as well as the original input image (a) including a human face from a user. In this case, the control unit 230 may input the original input image and the text prompt input to the first artificial neural network for which the second user-customized learning has been completed to generate the output image by editing a human face included in the photographic image as a smiling appearance according to the user's editing request included in the text prompt.

According to an embodiment, the server 200 may further include at least one of the second artificial neural network 240 trained to generate one or more text sentences by analyzing the photographic image, and the third artificial neural network 250 trained to calculate a similarity of people included in the photographic image by receiving two photographic images.

According to an embodiment, the second artificial neural network 240 may be trained to receive the photographic image and generate one or more text sentences including information about at least one of one or more elements from which the identity of a person included in the photographic image may be confirmed. As an example, the second artificial neural network 240 may be an image captioning model. For example, the image captioning model may extract features of the input image through a convolution neural network (CNN), obtain words appropriate for each feature through a recurrent neural network (RNN), and generate sentences describing images.

Figure 7:
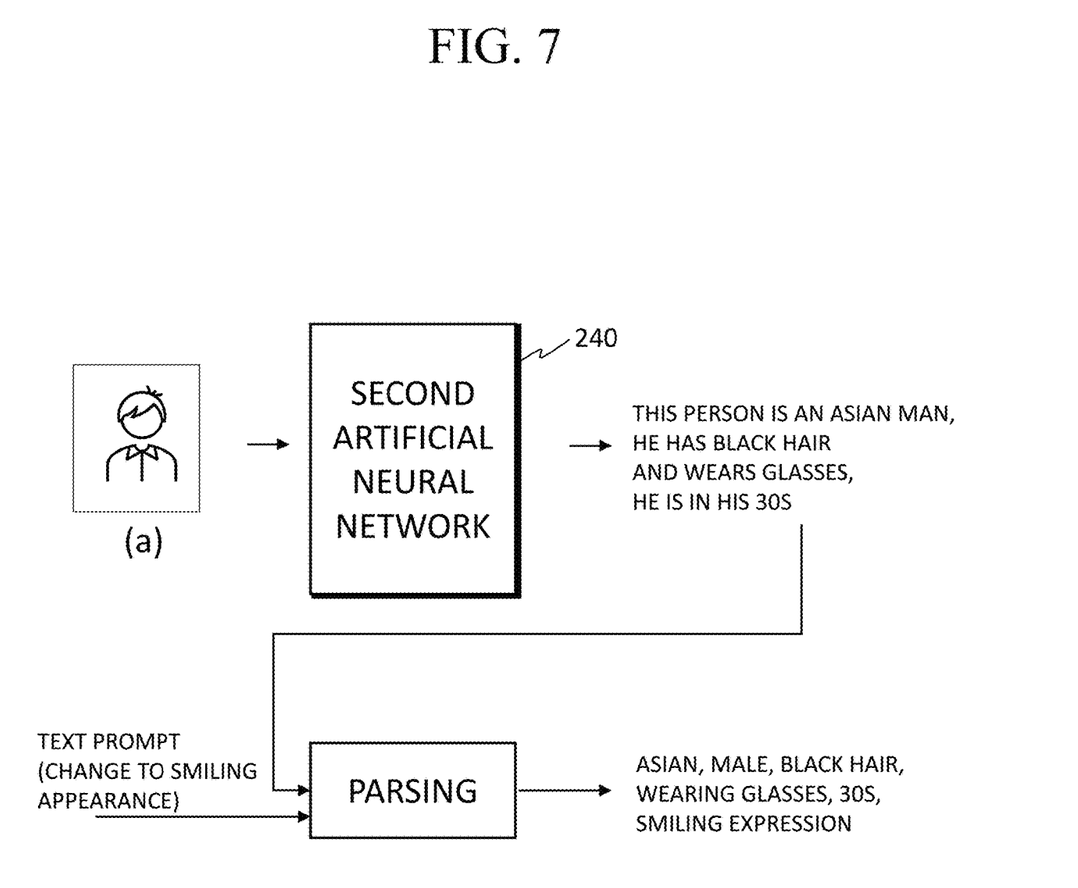

According to an embodiment, the control unit 230 may receive one or more text sentences by inputting original photo data to the second artificial neural network. Referring to FIG. 7, the control unit 230 may input the input original input image (a) to the second artificial neural network 240, and the second artificial neural network 240 may generate one or more sentences describing the original input image (a), such as "This person is an Asian man. He has black hair and is wearing glasses. He is in his 30 s."

According to an embodiment, the control unit 230 may parse one or more text sentences to extract one or more keywords for at least one of one or more elements from which a person's identity may be confirmed. For example, elements from which the person's identity may be confirmed may be at least one of gender, age, race, skin color, hair color, facial expression, and whether or not the person is wearing glasses. For example, keywords such as "Asian, man, black hair, wearing glasses, 30 s" may be extracted from "This person is an Asian man. He has black hair and wears glasses. He is in his 30 s."

According to an embodiment, the control unit 230 may parse the text prompt to extract one or more keywords for at least one of one or more elements from which a person's identity may be confirmed. For example, keywords such as "smiling expression" may be extracted by receiving a text prompt such as "Change to a smiling appearance."

According to an example, the control unit 230 may input a related image input by a user to the second artificial neural network 240 to extract keywords for the related image. Thereafter, the control unit 230 may determine whether to search for additional related images in the database by extracting the keywords extracted from the related image input by the user and the text prompt input by the user. For example, when there is no keyword for the keyword extracted from the text prompt input by the user among the keywords extracted from the related image input by the user, the control unit 230 may search for an image related to a missing keyword in the database and add the related image.

According to an embodiment, the control unit 230 may extract one or more sample images by searching the database according to keywords or a combination of the keywords based on one or more extracted keywords.

According to an example, the control unit 230 may generate a combination of keywords based on one or more extracted keywords. For example, the control unit 230 may create a combination of keywords based on the keywords extracted from the same sentence. As another example, the control unit 230 may create a combination of keywords based on the text sentence extracted from the second artificial neural network 240 and the text prompt input by the user.

Figure 8:
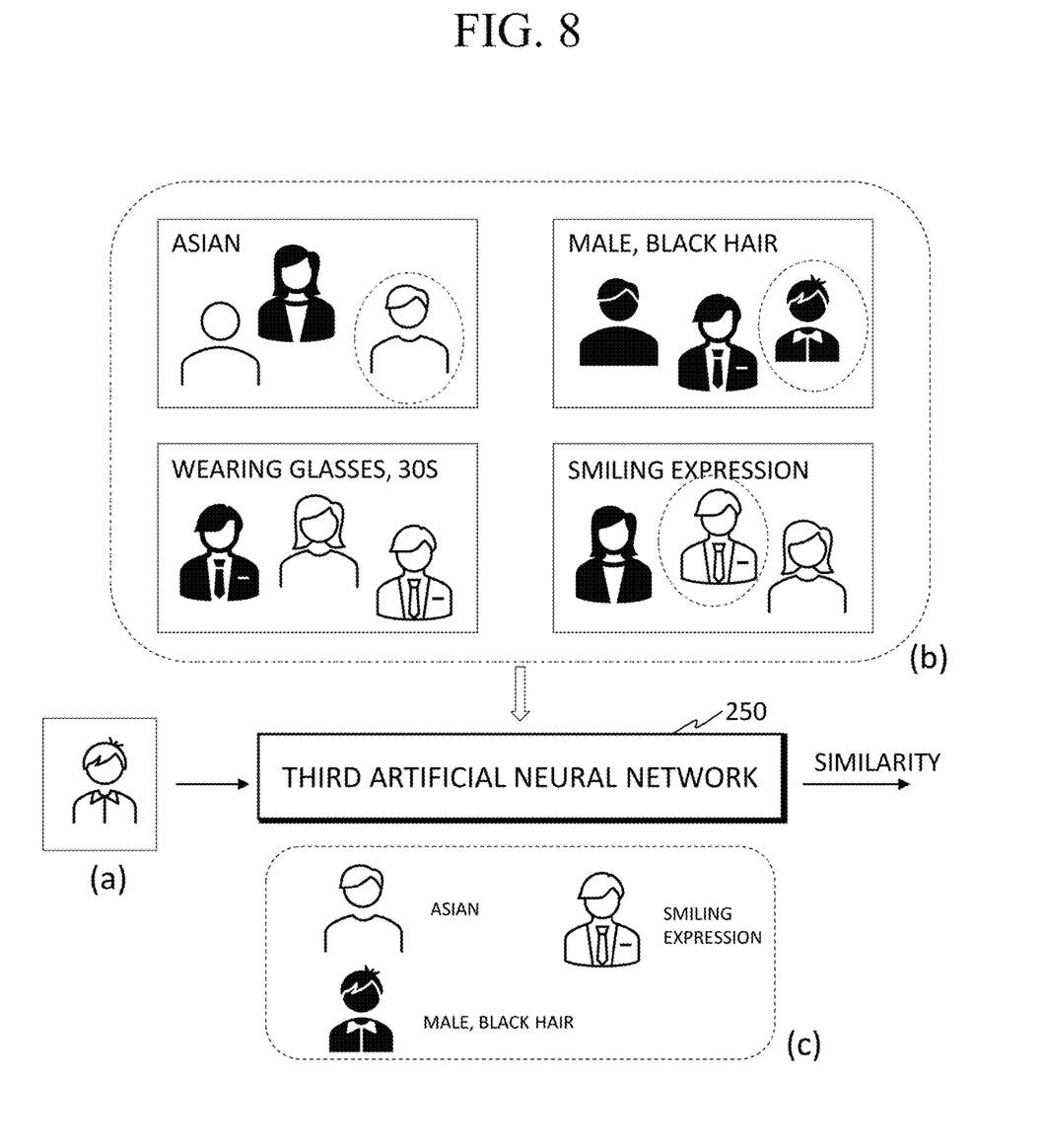

According to one example, the control unit 230 may extract one or more sample images by searching the database according to keywords or a combination of the keywords. Referring to FIG. 8, the control unit 230 may extract one or more sample images by searching the database based on keywords such as "Asian" and "smiling expression." As another example, the control unit 230 may extract one or more sample images by searching the database based on a combination of keywords such as "man, black hair" and "wearing glasses, 30 s."

According to an embodiment, the control unit 230 may classify one or more sample images according to keywords or a combination of the keywords to generate one or more clusters. Referring to FIG. 8, the control unit 230 may classify one or more sample images according to keywords or a combination of the keywords to generate one or more clusters (b).

According to an embodiment, the third artificial neural network 250 may be trained to receive two photographic images as an input and calculate a similarity of people included in the photographic images.

According to an embodiment, the control unit 230 inputs the original input image and one or more sample images to the third artificial neural network 250 to select one or more representative sample images with similarity greater than or equal to a predetermined similarity to the original input image among the one or more sample images.

Referring to FIG. 8, the control unit 230 may input the original input image (a) and the sample image (b) to the third artificial neural network 250 to calculate a similarity between the two images. In this case, the sample images may be input individually or in units of clusters.

For example, the control unit 230 may input each sample image (b) to the third artificial neural network 250 to calculate the similarity. Thereafter, the control unit 230 may select one or more representative sample images having a similarity greater than or equal to a predetermined reference.

For example, the control unit 230 may calculate a similarity by inputting each of the sample images (b) to the third artificial neural network 250. Thereafter, the control unit 230 may select one or more representative sample images having a similarity greater than or equal to a predetermined reference. In this case, when sample images of a predetermined number or more are selected in one cluster, the control unit 230 may select only a predetermined number of representative sample images in order of high similarity. On the other hand, in the case of a cluster that does not have a sample image having a similarity greater than or equal to a predetermined reference, the sample image included in the corresponding cluster and the keywords corresponding to the cluster may not be used for the user-customized learning.

According to an embodiment, the control unit 230 may generate one or more related images for the original input image based on one or more representative sample images. For example, the control unit 230 may generate one or more representative sample images (c) by selecting a sample image having a similarity greater than or equal to a predetermined reference. Thereafter, the control unit 230 may use the representative sample image (c) as the image related to the original input image.

According to an embodiment, the control unit 230 may generate text data for each of the one or more related images based on keywords of a cluster or a combination of the keywords to which one or more representative sample images belong. Referring to FIG. 8, the control unit 230 may use a keyword, which is a classification criterion for a cluster including one or more representative sample images selected from one or more sample images, as text data of the representative sample image. For example, when a sample image included in an "Asian" cluster is selected as the representative sample image, the text data of the selected representative sample image may be "Asian."

Figure 9:
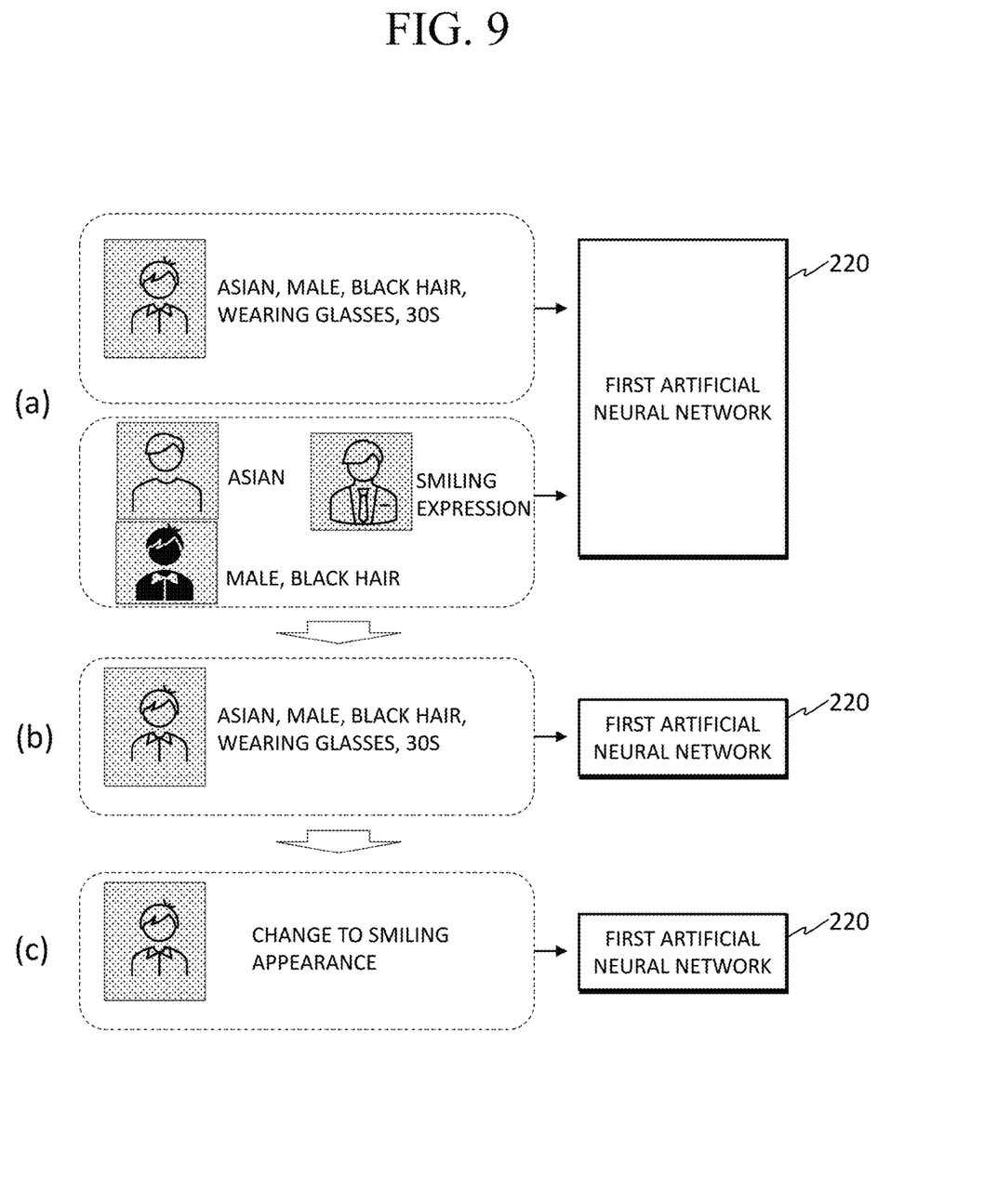

Referring to FIG. 9, in step (a), the control unit 230 may generate one or more synthesized images using the original input image and the representative sample image generated in FIG. 8 as the related images. In addition, the control unit 230 may perform the primary user-customized learning by inputting one or more synthesized images and text data of the synthetic images to the first artificial neural network. The control unit 230 may repeatedly perform the primary user-customized learning until the loss function for each synthesized image converges within a predetermined range.

For example, when the primary user-customized learning is completed, in step (b), the control unit 230 may input the synthesized image of the original input image and the text data of the original input image to the first artificial neural network to perform the secondary user-customized learning. The control unit 230 may repeatedly perform the secondary user-customized learning until the loss function for each synthesized image converges within a predetermined range.

When the secondary user-customized learning is completed, in step (c), the control unit 230 may input the synthesized image and the text prompt for the original input image to the first artificial neural network. Thereafter, the control unit 230 may output the output image output according to the synthesized image and the text prompt for the original input image as the image generated by editing the original input image according to the text prompt. For example, for the text prompt "Change to a smiling face" for the original input image, an expression of a person included in the original input image may be edited and output.

According to an embodiment, the control unit 230 may input the original input image and the text prompt to the first artificial neural network 220 subjected to the user-customized learning to transmit the output image generated by editing the generated original input image to the user terminal. According to an embodiment, the control unit 230 may input the original input image and the text prompt to the first artificial neural network subjected to the secondary user-customized learning to generate the output image by editing the original input image according to the text prompt and transmit the generated output image to the user terminal. Thereafter, the user terminal may provide the edited image received from the server to the user as illustrated in FIG. 3.

Figure 10:
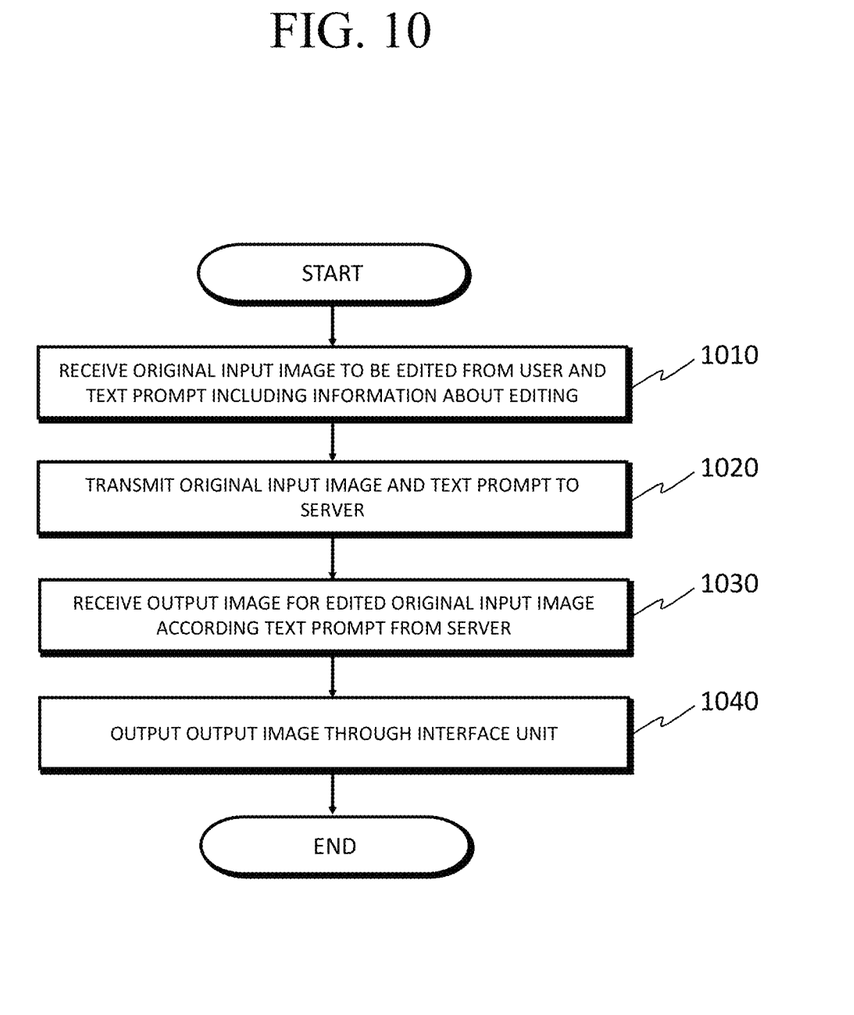
FIG. 10 is a flowchart illustrating a method of operating a user terminal according to an embodiment.

FIG. 10 is a flowchart illustrating a method of operating a user terminal according to an embodiment.

According to an embodiment, the user terminal may be a computing device including one or more processors and a memory that stores one or more programs executed by the one or more processors.

According to an embodiment, the user terminal may receive a text prompt including an original input image to be edited and information about editing from the user 1010. Thereafter, the user terminal may transmit the input image to the server including the first artificial neural network trained to edit the input image according to the input text prompt 1020. The user terminal may receive, from the server, the output image for the original input image edited according to the text prompt by the first artificial neural network subjected to the user-customized learning based on the original input image 1030, and may output the received output image through the interface unit 1040.

Figure 11:
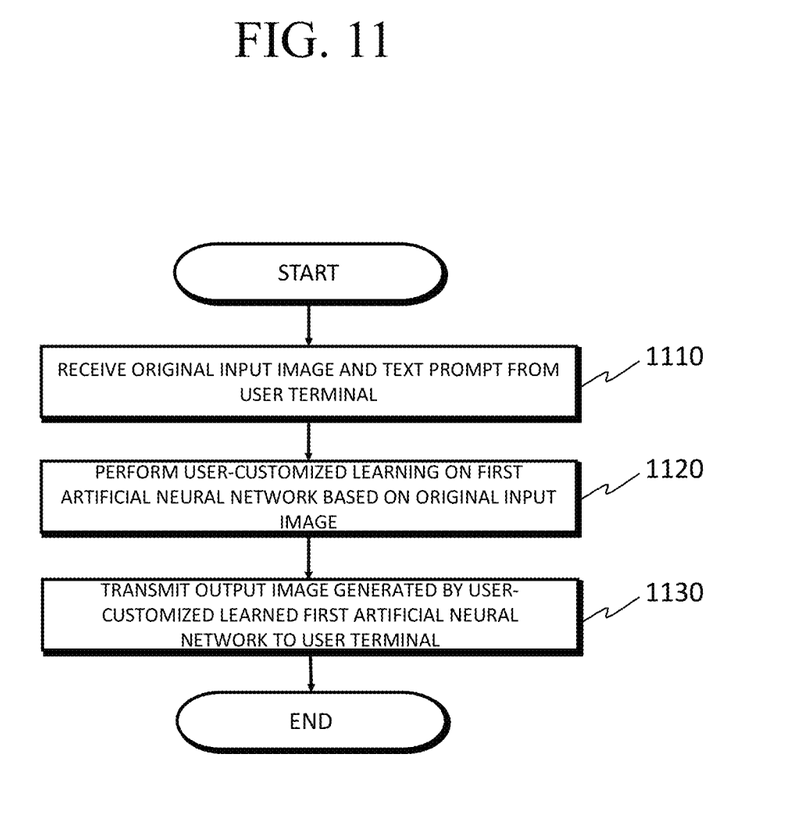
FIG. 11 is a flowchart illustrating a method of operating a server according to an embodiment.

FIG. 11 is a flowchart illustrating a method of operating a server according to an embodiment.

According to an embodiment, the server may be a computing device including one or more processors and a memory that stores one or more programs executed by the one or more processors.

According to an embodiment, the server may receive a text prompt including an original input image to perform image editing and image editing requirements from the user terminal 1110. Thereafter, the server may perform the user-customized learning on the first artificial neural network based on the original input image 1120, and input the original input image and the text prompt to the first artificial neural network subjected to the user-customized learning to transmit the output image by editing the generated original input image to the user terminal 1130.

Among the embodiments of FIGS. 10 and 11, the overlapping content with the content described with reference to FIGS. 1 to 9 is omitted.

An aspect of the present invention may be implemented as computer-readable codes on a computer-readable recording medium. Codes and code segments implementing the above program may be easily inferred by a computer programmer in the art. The computer-readable recording medium may be any kind of recording apparatus in which data that may be read by a computer system is stored. Examples of the computer readable recording medium may include a ROM, a RAM, a CD-ROM, a magnetic tape, a floppy disk, an optical disc, or the like. In addition, the computer readable recording medium may be distributed in computer systems connected to each other through a network, and may be written and executed in the computer-readable codes.

By performing user-customized learning on a pre-trained artificial neural network, it is possible to edit an image while preserving identity of the original image.

Hereinabove, the present invention has been described with reference to exemplary embodiments thereof. It will be understood by those skilled in the art to which the present invention pertains that the present invention may be implemented in a modified form without departing from essential characteristics of the present invention. Therefore, the scope of the present invention is not limited to the above-described embodiments, but should be construed to include various embodiments within the scope equivalent to the content described in claims.

What is claimed is:

1. A server comprising:
a communication unit that performs communication with a user terminal;
a first artificial neural network trained to receive text data and a synthesized image generated by synthesizing a photographic image including a person with noise and generate an output image corresponding to the photographic image; and
a control unit that controls user-customized learning and operation of the communication unit and the first artificial neural network,
wherein the control unit receives a text prompt including an original input image to perform image editing and an image editing request from the user terminal, performs the user-customized learning on the first artificial neural network based on the original input image, and transmits, to the user terminal, an edited output image from the original input image generated by inputting the original input image and the text prompt to the first artificial neural network subjected to the user-customized learning.

* * * * *